(12) United States Patent
Zhao et al.

(10) Patent No.: US 9,167,473 B2
(45) Date of Patent: Oct. 20, 2015

(54) COMMUNICATION PROCESSING METHOD, APPARATUS AND GATEWAY DEVICE

(71) Applicant: NTT DoCoMo, Inc., Tokyo (JP)

(72) Inventors: Qun Zhao, Beijing (CN); Xiaoli Wang, Beijing (CN); Yongsheng Zhang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 201 days.

(21) Appl. No.: 13/736,609

(22) Filed: Jan. 8, 2013

(65) Prior Publication Data
US 2013/0176847 A1 Jul. 11, 2013

(30) Foreign Application Priority Data
Jan. 9, 2012 (CN) .......................... 2012 1 0005165

(51) Int. Cl.
*H04W 28/02* (2009.01)
*H04L 12/893* (2013.01)
(52) U.S. Cl.
CPC ........... *H04W 28/0236* (2013.01); *H04L 47/40* (2013.01)
(58) Field of Classification Search
None
See application file for complete search history.

(56) References Cited

U.S. PATENT DOCUMENTS

| | | | | |
|---|---|---|---|---|
| 2003/0123394 A1* | 7/2003 | Neale et al. | ................... | 370/235 |
| 2004/0192312 A1* | 9/2004 | Li et al. | ......................... | 455/445 |
| 2005/0141455 A1* | 6/2005 | Kim et al. | ..................... | 370/331 |
| 2008/0043648 A1* | 2/2008 | Buga et al. | ..................... | 370/310 |
| 2009/0172184 A1* | 7/2009 | Wason et al. | ................. | 709/234 |
| 2010/0103880 A1* | 4/2010 | Fu | ................. | 370/328 |
| 2011/0116460 A1* | 5/2011 | Kovvali et al. | ................ | 370/329 |
| 2012/0163167 A1* | 6/2012 | Dade | ............................ | 370/229 |
| 2013/0013791 A1* | 1/2013 | Kotecha et al. | ............... | 709/227 |
| 2013/0114408 A1* | 5/2013 | Sastry et al. | .................... | 370/231 |

OTHER PUBLICATIONS

Postel, J. (ed.), "Transmission Control Protocol—DARPA Internet Program Protocol Specification", RFC 793, USC/Information Sciences Institute, Sep. 1981.*

* cited by examiner

*Primary Examiner* — Dang Ton
*Assistant Examiner* — Ronald H Davis
(74) *Attorney, Agent, or Firm* — Harness, Dickey & Pierce, PLC

(57) ABSTRACT

The communication processing method is used in a network gateway device, wherein the network gateway device is coupled to a wireless terminal through a first wireless network and to a base station through a second wireless network different from the first wireless network. The method maintains a first TCP link between the network gateway device and the wireless terminal through the first wireless network; maintains a second TCP link between the network gateway device and a service providing server through the second wireless network; and performs a TCP transmission optimization on the first TCP link or the second TCP link to be optimized by a corresponding optimization method so as to improve a transmission performance between the wireless terminal and the service providing server. The optimization may be performed more specifically and a transmission performance between the wireless terminal and the service providing server may be improved.

18 Claims, 3 Drawing Sheets

COMMUNICATION PROCESSING METHOD, APPARATUS AND GATEWAY DEVICE

BACKGROUND OF THE INVENTION

1. Field of the Invention

This invention relates to a wireless communication field, and particularly to a communication processing method, an apparatus and a gateway device.

2. Description of the Prior Art

Currently, TCP (Transmission Control Protocol) is a connection oriented (connection directed) and reliable transport layer communication protocol based on a byte flow, which is defined by RFC 793 of IETF. The TCP is widely applied in data transmission in Internet for users.

According to the TCP, an end-to-end connection between a wireless terminal and a remote server may be established. At two ends of the TCP, respective protocols run in order to ensure that the user data can be transmitted sequentially and correctly.

At the same time, the congestion control mechanism included in the TCP may dynamically adjust a size of the transmission window at the transmitting side so as to prevent the transmitting side from transmitting data without limit, which may result in the network congestion. According to the congestion control mechanism of TCP, whether a packet is lost has been taken as an indicator of whether the network congestion occurs. According to the TCP, when an ACK packet having a same sequence number may be received continuously for several times (for example, 3 times), the size of the transmission window will be reduced by a half so as to reduce the transmission rate and to prevent the congestion.

However, at the beginning of designing the TCP, the main application environment is supposed to be for a wired network and the properties for wireless environment are less concerned. In the wired network, data packet loss due to transmission itself seldom happens (for example, the packet loss rate is less than $10^{-6}$). Therefore, according to the congestion control mechanism of the TCP, it is reasonable to assume that the data packet loss is due to congestion and accordingly the transmission rate is reduced to prevent such congestion. However, in the wireless environment, the data packet loss due to the wireless transmission itself cannot be ignored, such as the wireless signal loss, channel fading and various interference shields. According to the congestion control mechanism of the TCP, the packet loss due to the wireless transmission will be wrongly regarded as the packet loss due to the congestion and the transmission rate will be unnecessarily reduced, which may result in the reduction of the transmission rate.

On the other hand, the transmission delay of the wired network is comparatively short and does not fluctuate a lot, while the transmission delay of the wireless network (for example, cellular network) is comparatively long and fluctuates a lot, which disadvantageously influences the performance of the TCP.

According to conventional optimization solutions for using the TCP in the wireless network, it is assumed that the wireless terminal is coupled to the wired network through certain wireless network (for example cellular network or WLAN) and then is coupled to the server in the Internet. The two ends of the TCP are established on the wireless terminal and the server in the Internet respectively. Since the TCP connection is realized through the wireless network, the high data packet loss and delay characteristics of the wireless network may influence the performance of the TCP connection adversely.

As described above, according to the conventional solution, it is assumed that the TCP connection accesses the wired network and Internet through a wireless network. However, with the development of the technologies, the wireless terminal may access Internet through the heterogeneous network and the conventional TCP optimization solutions cannot be adapted to the heterogeneous network.

SUMMARY OF THE INVENTION

An objective of embodiments of the present disclosure is to provide a communication processing method, an apparatus and a gateway device adapted to a TCP optimization of a heterogeneous wireless network.

In order to achieve the above objective, an embodiment of the present disclosure provides a communication processing method used in a network gateway device, wherein the network gateway device is coupled to a wireless terminal through a first wireless network and to a base station through a second wireless network different from the first wireless network and the communication processing method comprises:

maintaining a first TCP link between the network gateway device and the wireless terminal through the first wireless network;

maintaining a second TCP link between the network gateway device and a service providing server through the second wireless network; and performing a TCP transmission optimization on the first TCP link or the second TCP link to be optimized by a corresponding optimization method so as to improve a transmission performance between the wireless terminal and the service providing server.

In the above communication processing method, when a third TCP link is already established between the wireless terminal and the service providing server, the method further comprises dividing the third TCP link into the first TCP link and the second TCP link.

In the above communication processing method, further comprises: buffering a data packet to be sent to the wireless terminal; and after receiving ACK messages that correspond to all data packets not buffered but sent to the wireless terminal, dividing the third TCP link into the first TCP link and the second TCP link.

In the above communication processing method, further comprises: determining whether there is a continuous data service interaction between the wireless terminal and the service providing server to obtain a first determining result; and when the first determining result indicates that there is the continuous data service interaction between the wireless terminal and the service providing server, dividing the third TCP link into the first TCP link and the second TCP link.

In the above communication processing method, further comprises: determining whether a signal quality of a WLAN exceeds a preset quality threshold to obtain a second determining result; and when the second determining result indicates that the signal quality of the WLAN is lower than the preset quality threshold, dividing the third TCP link into the first TCP link and the second TCP link.

In the above communication processing method, an uplink buffer area and a downlink buffer area are set in the network gateway device and the method further comprises: when data buffered in the uplink buffer area exceeds a first data amount preset threshold, sending a TCP ACK message that carries an information indicating a receiving window is zero to the wireless terminal so as to prevent the wireless terminal from further sending TCP data packets; and/or when data buffered in the downlink buffer area exceeds a second data amount preset threshold, sending a TCP ACK message that carries an information indicating a receiving window is zero to the service providing server so as to prevent the service providing server from further sending a TCP data packet.

In order to achieve the above objective, an embodiment of the present disclosure provides a communication processing apparatus used in a network gateway device, wherein the network gateway device is coupled to a wireless terminal through a first wireless network and to a base station through a second wireless network different from the first wireless network and the communication processing apparatus comprises: a first TCP end, configured to maintain a first TCP link between the network gateway device and the wireless terminal through the first wireless network;

a second TCP end, configured to maintain a second TCP link between the network gateway device and a service providing server through the second wireless network; and an optimization module, configured to perform a TCP transmission optimization on the first TCP link or the second TCP link to be optimized by a corresponding optimization method so as to improve a transmission performance between the wireless terminal and the service providing server.

When a third TCP link is already established between the wireless terminal and the service providing server, the communication processing apparatus further comprises: a dividing module, configured to divide the third TCP link into the first TCP link and the second TCP link.

The communication processing apparatus further comprises: a buffer module, configured to buffer a data packet to be sent to the wireless terminal; and a first activating module, configured to activate the dividing module after receiving ACK messages that correspond to all data packets not buffered but sent to the wireless terminal.

The communication processing apparatus further comprises: a first determining module, configured to determine whether there is a continuous data service interaction between the wireless terminal and the service providing server to obtain a first determining result; and a second activating module, configured to activate the dividing module when the first determining result indicates that there is the continuous data service interaction between the wireless terminal and the service providing server.

The communication processing apparatus further comprises: a second determining module, configured to determine whether a signal quality of a WLAN exceeds a preset quality threshold to obtain a second determining result; and a third activating module, configured to activate the dividing module when the second determining result indicates that the signal quality of the WLAN is lower than the preset quality threshold.

An uplink buffer area and a downlink buffer area are set in the network gateway device and the communication processing apparatus further comprises: a first message sending module, configured to send a TCP ACK message that carries an information indicating a receiving window is zero to the wireless terminal so as to prevent the wireless terminal from further sending a TCP data packet when data buffered in the uplink buffer area exceeds a first data amount preset threshold; and/or a second message sending module, configured to send a TCP ACK message that carries an information indicating a receiving window is zero to the service providing server so as to prevent the service providing server from further sending a TCP data packet when data buffered in the downlink buffer area exceeds a second data amount preset threshold.

In order to achieve the above objective, an embodiment of the present disclosure provides a network gateway device, wherein the network gateway device is coupled to a wireless terminal through a first wireless network and to a base station through a second wireless network different from the first wireless network and the network gateway device comprises:

a first TCP end, configured to maintain a first TCP link between the network gateway device and the wireless terminal through the first wireless network;

a second TCP end, configured to maintain a second TCP link between the network gateway device and a service providing server through the second wireless network; and an optimization module, configured to perform a TCP transmission optimization on the first TCP link or the second TCP link to be optimized by a corresponding optimization method so as to improve a transmission performance between the wireless terminal and the service providing server.

When a third TCP link is already established between the wireless terminal and the service providing server, the network gateway device further comprises: a dividing module, configured to divide the third TCP link into the first TCP link and the second TCP link.

The network gateway device further comprises: a buffer module, configured to buffer a data packet to be sent to the wireless terminal; and a first activating module, configured to activate the dividing module after receiving ACK messages that correspond to all data packets not buffered but sent to the wireless terminal.

The network gateway device further comprises: a first determining module, configured to determine whether there is a continuous data service interaction between the wireless terminal and the service providing server to obtain a first determining result; and a second activating module, configured to activate the dividing module when the first determining result shows that there is the continuous data service interaction between the wireless terminal and the service providing server.

The network gateway device further comprises: a second determining module, configured to determine whether a signal quality of a WLAN exceeds a preset quality threshold to obtain a second determining result; and a third activating module, configured to activate the dividing module when the second determining result indicates that the signal quality of the WLAN is lower than the preset quality threshold.

An uplink buffer area and a downlink buffer area are set in the network gateway device and the network gateway device further comprises: a first message sending module, configured to send a TCP ACK message that carries an information indicating a receiving window is zero to the wireless terminal so as to prevent the wireless terminal from further sending a TCP data packet when data buffered in the uplink buffer area exceeds a first data amount preset threshold; and/or a second message sending module, configured to send a TCP ACK message that carries an information indicating a receiving window is zero to the service providing server so as to prevent the service providing server from sending a TCP data packet when data buffered in the downlink buffer area exceeds a second data amount preset threshold.

The embodiments of the present disclosure have the following advantageous effects.

In the embodiments of the present disclosure, different TCP links can be maintained for different wireless networks and different optimizations are performed according to features of the wireless networks that correspond to the TCP links to be optimized so that the optimization may be performed more pertinently and a transmission performance between the wireless terminal and the service providing server may be improved accordingly.

DETAILED DESCRIPTION OF THE PREFERRED EMBODIMENTS

According to the communication processing method, apparatus and network gateway device provided by embodiments of the present invention, a TCP link between a wireless terminal and a server is divided (separated) into a first link and a second link at the network gateway device end. The first link and the second link are treated differently so as to provide a TCP optimization adapted to a heterogeneous network.

Before describing the communication processing method, apparatus and network gateway device in detail, a network environment for embodiments of the present disclosure will be described first so as to better understand the embodiments of the present disclosure.

Figure 1:
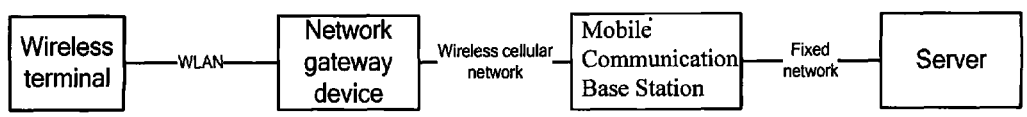
FIG. 1 is a schematic diagram showing an application scenario for a communication processing method according to an embodiment of the present disclosure.

FIG. 1 is a schematic diagram showing an application scenario for a communication processing method according to an embodiment of the present disclosure. As shown in FIG. 1, a network gateway device is coupled to a wireless terminal and a mobile communication base station. The wireless terminal is coupled to the network gateway device through a first wireless network (for example WLAN). The network gateway device is coupled to the mobile communication base station through a second wireless network (for example wireless cellular network). The mobile communication base station is coupled to a server through a fixed network, for example, a wired network.

The above networks are referred to as the heterogeneous network since the wireless terminal accesses the mobile communication base station through two different wireless networks. One wireless network is the first wireless network (for example WLAN) and the other wireless network is the second wireless network (for example wireless cellular network).

The first wireless network and the second wireless network have different features, which may influence the TCP differently. The detailed explanation is as follows.

A packet loss rate of the first wireless network is higher than that of the second wireless network, for example.

A delay performance of the first wireless network is better than that of the second wireless network, for example.

For example, when the first wireless network is the WLAN and the second wireless network is the wireless cellular network, the wireless cellular network may ensure a comparatively low packet loss rate and will not be a main factor in influencing the transmission performance of the TCP link. However, its delay and delay jitter are comparatively large. In a QoS level of $10^{-6}$ order packet loss rate, its corresponding packet delay may reach 300 ms and sometimes there may be a long delay impulse at a second order, which may seriously influence the transmission performance of the TCP link.

Since a bottom layer of the WLAN adopts a comparatively simple design and a transmission mechanism based on random access, it has a comparatively good delay performance and will not become a main factor influencing the transmission performance of the TCP link. However, it may not ensure a TCP packet loss rate as low as that of the wireless cellular network. For example, in most cases, the packet loss rate may reach as high as $10^{-3}$ to $10^{-2}$, which may seriously influence the transmission performance of the TCP link.

Based on the above understanding, according to the communication processing method in an embodiment of the present disclosure, the TCP link between the wireless terminal, the network gateway and the server may be established as follows.

A first TCP link between the network gateway device and the wireless terminal may be established through the first wireless network; and a second TCP link between the network gateway device and the server is established.

A part of the second TCP link is established through the second wireless network to couple the network gateway device and the base station.

After dividing the TCP link, the network gateway device may treat the divided TCP links differently according to the two different wireless networks so as to improve the transmission performance of the TCP link.

Figure 2:
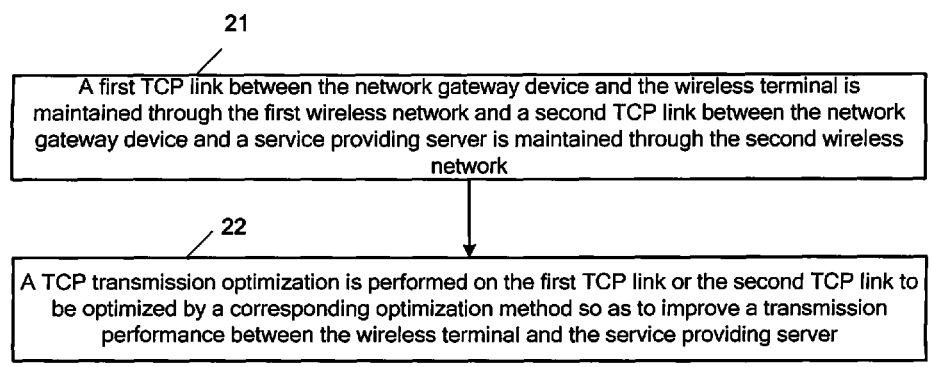
FIG. 2 is a flow chart showing a communication processing method according to an embodiment of the present disclosure.

The communication processing method according to an embodiment of the present disclosure is used for a network gateway device. One end of the network gateway device is coupled to the wireless terminal through the first wireless network and the other end of the network gateway device is coupled to the base station through the second wireless network different from the first wireless network. The communication processing method is shown in FIG. 2 and comprises the following steps.

In step 21, a first TCP link between the network gateway device and the wireless terminal is maintained through the first wireless network and a second TCP link between the network gateway device and a service providing server is maintained through the second wireless network.

In step 22, a TCP transmission optimization is performed on the first TCP link or the second TCP link to be optimized by a corresponding optimization method so as to improve a transmission performance between the wireless terminal and the service providing server.

In the communication processing method according to the embodiment of the present disclosure, different TCP links are maintained for different wireless networks and different optimizations are performed according to features of the wireless networks that correspond to the TCP links to be optimized respectively so that the transmission performance between the wireless terminal and the service providing server may be improved.

In the embodiment of the present disclosure, there are multiple ways to determine the TCP links to be optimized, for example, according to the packet loss rate or according to the transmission delay, or the TCP links to be optimized is determined by setting one of TCP links as a default or making all TCP links as the default. Therefore, the TCP links to be optimized may comprise only one of the first TCP link and the second TCP link, or comprise both the first TCP link and the second TCP link.

As mentioned above, since the first wireless network is different from the second wireless network, they influence the TCP transmission differently. For example, when the first wireless network is the WLAN and the second wireless network is the wireless cellular network, the WLAN influences the packet loss rate of the TCP transmission much more than the wireless cellular network influences the packet loss rate of the TCP transmission, while on the contrary, the wireless cellular network influences the delay of the TCP transmission much more than the WLAN influences the delay of the TCP transmission.

Therefore, if the packet loss rate of the TCP transmission between the wireless terminal and the service providing server needs to be improved, it will achieve a much better effect by optimizing conducted within the WLAN; while if the delay of the TCP transmission between the wireless terminal and the service providing server needs to be improved, it will achieve a much better effect by optimizing conducted within the wireless cellular network.

Therefore, according to the embodiment of the present disclosure, the delay performance optimization needs to be performed where the TCP link has a comparatively large transmission delay, while the packet loss optimization needs to be performed where the TCP link has a comparatively high packet loss rate.

According to the embodiment of the present disclosure, the above communication processing method may be applied to different scenarios and will be illustrated in detail, respectively.

<Scenario 1>

The communication processing method according to the embodiment of the present disclosure may be applied to a service initiating phase, i.e. when the wireless terminal initiates a communication request to the service providing server.

In this case, the first TCP link and the second TCP link need to be established first in the embodiment of the present disclosure.

When the network gateway device receives the communication request, it begins to establish the first TCP link and the second TCP link and performs the TCP transmission optimization on the first TCP link or the second TCP link to be optimized by a corresponding optimization method.

In the above scenario, according to the embodiment of the present disclosure, two TCP links are established by detecting and modifying at the network gateway device a SYN message sent from the UE while these processes are transparent to the UE and the service providing server, i.e. the UE and the service providing server may not sense (aware) these operations at the network gateway device.

<Scenario 2>

The communication processing method according to the embodiment of the present disclosure may be applied to a service middle phase, i.e. when a third TCP link has been established between the wireless terminal and the service providing server. In this case, the third TCP link between the wireless terminal and the service providing server needs to be divided (separated) into the first TCP link and the second TCP link in the embodiment of the present disclosure.

In the embodiment of the present disclosure, the network gateway device has two TCP clients when dividing the third TCP link into the first TCP link and the second TCP link where one is interacting with the TCP client of the wireless terminal and the other is interacting with the TCP client of the service providing server.

For the third TCP link, the network gateway device does not transparently transmit data and signal any more but encapsulates the data and signal into a new packet and then sends the new packet.

Of course, since the wireless terminal and the service providing server may interact in a confirmation mode, the method may further comprises the following two steps before dividing the third TCP link.

A data packet to be sent to the wireless terminal is buffered (backed up).

After receiving ACK messages that correspond to all data packets not buffered but sent to the wireless terminal, the third TCP link is divided into the first TCP link and the second TCP link.

In this case, since the network gateway device receives the ACK messages that correspond to the data packets not buffered before, it indicates that the data packets not buffered but sent to the wireless terminal before have been received by the wireless terminal correctly while other data packets which are not confirmed by the wireless terminal are buffered (backed up) in the network gateway device so that these data packets may be sent to the wireless terminal subsequently after the first TCP link is established and therefore there will be no service interruption, even if they are lost during transmission.

It should be noted that the method according to the embodiment of the present disclosure may be applied to any cases. However, for the transmission of the control signaling which requires less for the transmission rate or for the continuous data transmission, or when the transmission data amount is comparatively small, the benefits for employing the method according to the embodiment of the present disclosure are not obvious compared with the cost (for example the increased work load for the network gateway device) for implementing the method according to the embodiment of the present disclosure.

Based on the above description, the method according to the embodiment of the present disclosure may be only applied to continuous data transmission. In this case, the method according to the embodiment of the present disclosure may further comprise the following steps.

Whether there is a continuous data service interaction (for example, downloading video files, downloading application program setup files, playing streaming media, etc.) between the wireless terminal and the service providing server is determined to obtain a first determining result.

When the first determining result indicates that there is the continuous data service interaction between the wireless terminal and the service providing server, the first TCP link and the second TCP link are maintained (when the third TCP link has been already established, the third TCP link will be divide into the first TCP link and the second TCP link).

In the embodiment of the present disclosure, the continuous data service may be determined by several ways and will be illustrated in detail.

Determining Mode 1

The continuous data service may be determined based on a TCP port number currently used since a different service may use a different TCP port number.

Determining Mode 2

The continuous data service may be determined based on a statistic on existing data, such as a duration and data transmission amount of previous services. When the duration exceeds a time threshold and the data transmission amount exceeds a data amount threshold, it may be determined that there is the continuous data service.

The above determining modes are conventional methods for determining the continuous data service and will not be illustrated in detail here.

It should be noted that other modes may also be used to determine the continuous data service in embodiments of the present disclosure and will not be illustrated in detail here.

It should be noted that the method according to the embodiment of the present disclosure may be applied to any cases. However, when the network is less heterogeneous (for example, when the differences of both the transmission delay and the packet loss rate between two networks are comparatively small), the benefits for employing the method according to the embodiments of the present disclosure are not obvious compared with the cost (for example the increased work load for the network gateway device) for implementing the method according to the embodiment of the present disclosure.

Based on the above description, the method according to the embodiments of the present disclosure may be applied to the case in which the two wireless networks are apparently heterogeneous. In this case, assuming that the first wireless network is the WLAN and the second wireless network is the wireless cellular network, since the wireless cellular network is in a substantially stable state and the WLAN changes a lot because of the added users and the locations of users, which is a normal case. In this case, it is determined whether to employ the method of the embodiments of the present disclosure according to the state of the WLAN.

In this case, the method according to the embodiments of the present disclosure further comprises:

It is determined whether a signal quality of the WLAN exceeds a preset quality threshold to obtain a second determining result.

When the second determining result indicates that the signal quality of the WLAN is lower than preset quality threshold, the first TCP link and the second TCP link are maintained (in the case the third TCP link has been already established, the third TCP link is divided).

Figure 3:
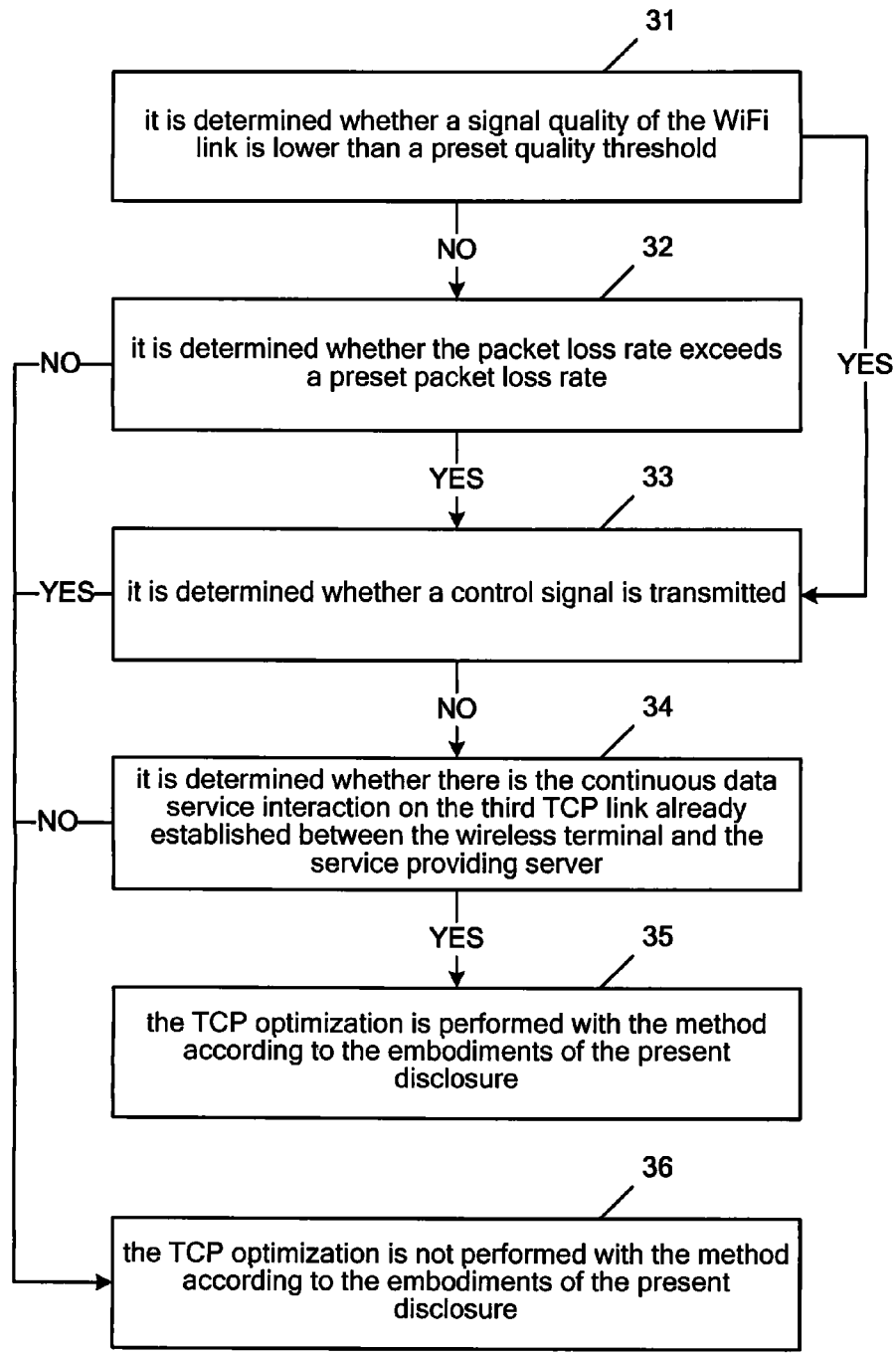
FIG. 3 is a flow chart showing a method for determining whether or not to adopt the communication processing method according to an embodiment of the present disclosure.

The procedure in which the above two methods for determining whether to employ the method of the embodiments of the present disclosure are combined will be described with reference to FIG. 3 and comprises the following steps.

In step 31, it is determined whether a signal quality of the WiFi link is lower than a preset quality threshold and if yes, proceeds to step 33; otherwise, proceeds to step 32.

In step 32, it is determined whether the packet loss rate exceeds a preset packet loss rate and if yes, proceeds to step 33; otherwise, proceeds to step 36.

In step 33, it is determined whether a control signal is transmitted and if yes, proceeds to step 36; otherwise, proceeds to step 34.

In step 34, it is determined whether there is a continuous data service interaction on the third TCP link already established between the wireless terminal and the service providing server and if yes, proceeds to step 35; otherwise, proceeds to step 36.

In step 35, the TCP optimization is performed using the method according to the embodiments of the present disclosure.

In step 36, the TCP optimization is not performed using the method according to the embodiments of the present disclosure.

In the embodiments of the present disclosure, the network gateway device may perform different optimization methods that correspond to the TCP links to be optimized so that the transmission performance between the wireless terminal and the service providing server may be improved.

When the first wireless network is the WLAN and the second wireless network is the wireless cellular network, based on the above description, the network gateway device needs to perform different optimization methods that correspond to the TCP links to be optimized, which may comprise the following three cases:

A first optimization is used to improve TCP performance with high packet loss rate on the first TCP link; or a second optimization is used to improve TCP performance with large transmission delay on the second TCP link; or the first optimization is used to improve TCP performance with high packet loss rate on the first TCP link and the a second optimization is used to improve TCP performance with large transmission delay on the second TCP link.

Since the third case includes the previous two cases, illustration will be made by taking the third case as an example.

In the embodiments of the present disclosure, the wireless terminal and the server exchange SYN/ACK messages through a 3-phase handshaking mechanism to determine different options in a newly established TCP connection. When the gateway monitors a first SYN message from the wireless terminal and if it is determined that the method according to the embodiments of the present disclosure needs to be employed to optimize on different wireless networks, the gateway will replace the TCP options in the first SYN message with the options in favor of the wireless cellular network (such as SACK, Timestamp and WindowScale) to obtain a second SYN message and then send the second SYN message to the service providing server to notify the service providing server to adopt the TCP options in the second SYN message to optimize the transmission delay; when the gateway receives a response message to the second SYN message from the service providing server, it returns the response message to the first SYN message to the wireless terminal.

Based on the above description, it can be seen that in the method according to the embodiments of the present disclosure, the network gateway device may monitor and modify the SYN messages sent from the UE to establish two TCP connections while the service providing server/UE may receive the SYN message/SYN response message normally and may think the SYN message/SYN response message are sent from the service providing server/UE. Therefore, the processing of the network gateway device is transparent to the UE and the service providing server, i.e. the UE and the service providing server may not sense (aware) the above operations of the network gateway device.

In the following, it will be described how to modify the congestion control mechanism in the embodiments of the present disclosure so as to prevent reducing the transmission window unnecessarily when retransmitting packets.

There might be comparatively high packet loss rate because of the complexity of channel status in the WLAN (such as the wireless signal loss, channel fading and various interference shields). In the conventional method, when multiple ACK packets with a same sequence are received (for example, when the receiver receives the second data packet, it will request a third data packet from the transmitter and the sequence for the ACK packet is 3; however, when the fourth and the fifth data packets are received while the third data packet is not received, it will still request the third data packet from the transmitter and the sequence for the ACK packet is 3.), it will be determined that the third data packet has been lost and the reason is because of the congestion so the transmission rate will be unnecessarily reduced.

However, in the embodiments of the present disclosure, the data packet will be retransmitted without reducing the transmission rate.

How to improve the TCP performance under high packet loss rate, how to improve the TCP performance under long delay have been particularly described in the TCP related specifications and there are different conventional methods to reduce the packet loss rate and/or the transmission delay so these will not be illustrated in detail here.

In the embodiments of the present disclosure, buffer areas for the uplink/downlink transmission are set respectively. When the data in the buffer area exceeds a preset threshold, it will send a TCP ACK message that carries an information indicating a receiving window is zero to the wireless terminal/ service providing server so as to prevent them from further sending a TCP data packet.

The above will be illustrated in detail as follows.

When data buffered in the uplink buffer area exceeds a first data amount preset threshold, sending a TCP ACK message that carries information indicating a receiving window is zero to the wireless terminal so as to prevent the wireless terminal from further sending a TCP data packet.

When data buffered in the downlink buffer area exceeds a second data amount preset threshold, sending a TCP ACK message that carries an information indicating a receiving window is zero to the service providing server so as to prevent the service providing server from further sending a TCP data packet.

Based on the above method, it may be ensured that the buffer will not overflow so as to ascertain that the data will not be lost.

The preset threshold may be calculated according to the data transmission rate and the Round Trip Time (RRT) and the formula is as follow: Threshold=maximum buffer−transmission rate*RRT.

RRT refers to a time period beginning from the time sending the data packet, and then receiving at the receiver, and then the receiver sending the response to the data packet and to the time receiving the response.

Figure 4:
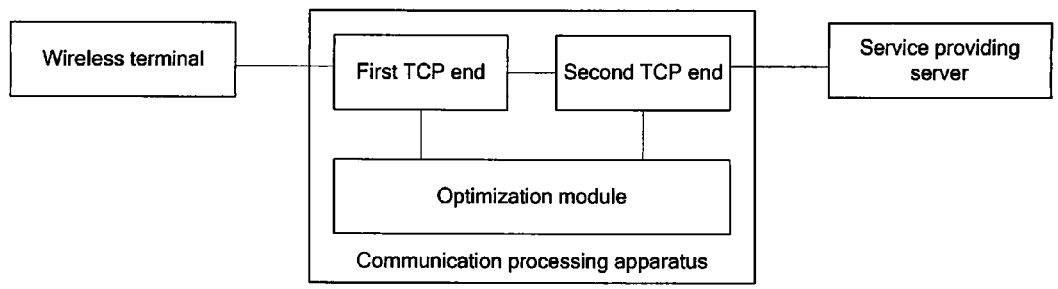
FIG. 4 is a schematic diagram showing a structure of the communication processing apparatus according to an embodiment of the present disclosure.

A communication processing apparatus according to an embodiment of the present disclosure is used in a network gateway device and the network gateway device is coupled to a wireless terminal through a first wireless network and to a base station through a second wireless network different from the first wireless network. The structure of the communication processing apparatus is shown in FIG. 4 and comprises: a first TCP end, configured to maintain a first TCP link between the network gateway device and the wireless terminal through the first wireless network; a second TCP end, configured to maintain a second TCP link between the network gateway device and a service providing server through the second wireless network; and an optimization module, configured to perform a TCP transmission optimization on the first TCP link or the second TCP link to be optimized by a corresponding optimization method so as to improve a transmission performance between the wireless terminal and the service providing server.

The communication processing apparatus may be used in the middle phase of the service, i.e. when the third TCP link has been already established between the wireless terminal and the service providing server and at this time, the communication processing apparatus may further comprise: a dividing module, configured to divide the third TCP link into the first TCP link and the second TCP link.

When the communication processing apparatus according to the embodiments of the present disclosure is used in the middle phase of the service, it should be ensured that the data packets are transmitted correctly and sequentially and at this time, the communication processing apparatus may further comprise: a buffer module, configured to buffer a data packet to be sent to the wireless terminal; and a first activating module, configured to activate the dividing module after receiving ACK messages that correspond to all data packets not buffered but sent to the wireless terminal.

The communication processing apparatus according to the embodiments of the present disclosure may be used in different cases, for example when activated according to the service type, and at this time, the communication processing apparatus may further comprise: a first determining module, configured to determine whether there is a continuous data service interaction between the wireless terminal and the service providing server to obtain a first determining result; and a second activating module, configured to activate the dividing module when the first determining result indicates that there is the continuous data service interaction between the wireless terminal and the service providing server.

When activated according to the signal quality, the communication processing apparatus may further comprise: a first determining module, configured to determine whether a signal quality of a WLAN exceeds a preset quality threshold to obtain a second determining result; and a third activating module, configured to activate the dividing module when the second determining result indicates that the signal quality of the WLAN is lower than the preset quality threshold.

Since the network gateway device does not transparently transmit the data packet, in order to ensure the accuracy of data interaction, an uplink buffer area and a downlink buffer area are set in the network gateway device and the communication processing apparatus further comprises: a first message sending module, configured to send a TCP ACK message that carries an information indicating a receiving window is zero to the wireless terminal so as to prevent the wireless terminal/service providing server from further sending a TCP data packet when data buffered in the uplink buffer area exceeds a first data amount preset threshold; and/or a second message sending module, configured to send a TCP ACK message that carries an information indicating a receiving window is zero to the service providing server so as to prevent the service providing server from further sending a TCP data packet when data buffered in the downlink buffer area exceeds a second data amount preset threshold.

A network gateway device according to an embodiment of the present disclosure is coupled to a wireless terminal through a first wireless network and to a base station through a second wireless network different from the first wireless network and the network gateway device comprises: a first TCP end, configured to maintain a first TCP link between the network gateway device and the wireless terminal through the first wireless network; a second TCP end, configured to maintain a second TCP link between the network gateway device and a service providing server through the second wireless network; and an optimization module, configured to perform a TCP transmission optimization on the first TCP link or the second TCP link to be optimized by a corresponding optimization method so as to improve a transmission performance between the wireless terminal and the service providing server.

When a third TCP link has been already established between the wireless terminal and the service providing server, the network gateway device further comprises: a dividing module, configured to divide the third TCP link into the first TCP link and the second TCP link.

The network gateway device may further comprise: a buffer module, configured to buffer a data packet to be sent to the wireless terminal; and a first activating module, configured to activate the dividing module after receiving ACK messages that correspond to all data packets not buffered but sent to the wireless terminal.

The network gateway device may further comprise: a first determining module, configured to determine whether there is a continuous data service interaction between the wireless terminal and the service providing server to obtain a first determining result; and a second activating module, configured to activate the dividing module when the first determining result indicates that there is the continuous data service interaction between the wireless terminal and the service providing server.

The network gateway device may further comprise: a first determining module, configured to determine whether a signal quality of a WLAN exceeds a preset quality threshold to obtain a second determining result; and a third activating module, configured to activate the dividing module when the second determining result indicates that the signal quality of the WLAN exceeds the preset quality threshold.

In the network gateway device, an uplink buffer area and a downlink buffer area are set and the network gateway device further comprises: a first message sending module, configured to send a TCP ACK message that carries an information indicating a receiving window is zero to the wireless terminal so as to prevent the wireless terminal from further sending a TCP data packet when data buffered in the uplink buffer area exceeds a first data amount preset threshold; and/or a second message sending module, configured to send a TCP ACK message that carries an information indicating a receiving window is zero to the service providing server so as to prevent the service providing server from further sending a TCP data packet when data buffered in the downlink buffer area exceeds a second data amount preset threshold.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the present disclosure.

What is claimed is:

1. A communication processing method used in a network gateway device, wherein the network gateway device is coupled to a wireless terminal through a first wireless network and to a base station through a second wireless network different from the first wireless network, the communication processing method comprising:
   maintaining a first Transmission Control Protocol (TCP) link between the network gateway device and the wireless terminal through the first wireless network, when the transmission performance of the first wireless network as measured by the network gateway device is larger than a first threshold value;
   maintaining a second TCP link between the network gateway device and a service providing server through the second wireless network, when the transmission performance of the second wireless network as measured by the network gateway device is larger than a second threshold value;
   determining which TCP link between the first TCP link and the second TCP link is to be optimized, based on whether or not the transmission performance to be improved between the wireless terminal and the service providing server is larger than a third threshold value, wherein the transmission performance to be improved comprises packet loss rate, transmission delay or an inverse of transmission rate for a current TCP transmission; and
   performing a TCP transmission optimization on the determined TCP link between the first TCP link and the second TCP link to be optimized, so as to reduce/improve at least one of packet loss rate, transmission delay and transmission rate for the current TCP transmission corresponding to the determined TCP link to be optimized, till the transmission performance of the determined TCP link between the first TCP link and the second TCP link is smaller than or equal to the third threshold value, thereby improving a corresponding transmission performance between the wireless terminal and the service providing server.

2. The communication processing method according to claim 1, wherein when a third TCP link is already established between the wireless terminal and the service providing server, the method further comprises dividing the third TCP link into the first TCP link and the second TCP link by using two TCP clients provided by the network gateway device, wherein one TCP client of the network gateway device interacts with a TCP client of the wireless terminal so as to form the first TCP link, and the other TCP client of the network gateway device interacts with a TCP client of the service providing server so as to form the second TCP link.

3. The communication processing method according to claim 2, further comprising:
   buffering a data packet to be sent to the wireless terminal; and
   after receiving ACK messages that correspond to all data packets not buffered but sent to the wireless terminal, dividing the third TCP link into the first TCP link and the second TCP link.

4. The communication processing method according to claim 2, further comprising:
   determining whether there is a continuous data service interaction between the wireless terminal and the service providing server to obtain a first determining result, based on whether a duration of service transmitted between the wireless terminal and the service providing server exceeds a time threshold and whether data transmission amount of service transmitted between the wireless terminal and the service providing server exceeds a data amount threshold; and
   when the first determining result indicates that there is the continuous data service interaction between the wireless terminal and the service providing server, dividing the third TCP link into the first TCP link and the second TCP link.

5. The communication processing method according to claim 2, further comprising:
   determining whether a signal quality of the first wireless network exceeds a preset quality threshold to obtain a second determining result; and
   when the second determining result indicates that the signal quality of the first wireless network is lower than the preset quality threshold, dividing the third TCP link into the first TCP link and the second TCP link.

6. The communication processing method according to claim 1, wherein an uplink buffer area and a downlink buffer area are set in the network gateway device and the method further comprises:
   when data buffered in the uplink buffer area exceeds a first data amount preset threshold, sending a TCP ACK message that carries an information indicating a receiving window is zero to the wireless terminal so as to prevent the wireless terminal from further sending TCP data packets; and/or
   when data buffered in the downlink buffer area exceeds a second data amount preset threshold, sending a TCP ACK message that carries an information indicating a receiving window is zero to the service providing server so as to prevent the service providing server from further sending TCP data packets.

7. A communication processing apparatus used in a network gateway device, wherein the network gateway device is coupled to a wireless terminal through a first wireless network and to a base station through a second wireless network different from the first wireless network, the communication processing apparatus comprising:

a first TCP end, configured to maintain a first Transmission Control Protocol (TCP) link between the network gateway device and the wireless terminal through the first wireless network, when the transmission performance of the first wireless network as measured by the network gateway device is larger than a first threshold value;

a second TCP end, configured to maintain a second TCP link between the network gateway device and a service providing server through the second wireless network, when the transmission performance of the second wireless network as measured by the network gateway device is larger than a second threshold value;

a determining module, configured to determine which TCP link between the first TCP link and the second TCP link is to be optimized, based on whether or not the transmission performance to be improved between the wireless terminal and the service providing server is larger than a third threshold value, wherein the transmission performance to be improved comprises packet loss rate, transmission delay or an inverse of transmission rate for a current TCP transmission; and an optimization module, configured to perform a TCP transmission optimization on the determined TCP link between the first TCP link and the second TCP link to be optimized, so as to reduce/improve at least one of packet loss rate, transmission delay and transmission rate for the current TCP transmission corresponding to the determined TCP link to be optimized, till the transmission performance of the determined TCP link between the first TCP link and the second TCP link is smaller than or equal to the third threshold value, thereby improving a corresponding transmission performance between the wireless terminal and the service providing server.

8. The communication processing apparatus according to claim 7, wherein when a third TCP link is already established between the wireless terminal and the service providing server, the apparatus further comprises:

a dividing module, configured to divide the third TCP link into the first TCP link and the second TCP link by using two TCP clients provided by the network gateway device, wherein one TCP client of the network gateway device interacts with a TCP client of the wireless terminal so as to form the first TCP link, and the other TCP client of the network gateway device interacts with a TCP client of the service providing server so as to form the second TCP link.

9. The communication processing apparatus according to claim 8, further comprising:

a buffer module, configured to buffer a data packet to be sent to the wireless terminal; and a first activating module, configured to activate the dividing module after receiving ACK messages that correspond to all data packets not buffered but sent to the wireless terminal.

10. The communication processing apparatus according to claim 8, further comprising:

a first determining module, configured to determine whether there is a continuous data service interaction between the wireless terminal and the service providing server to obtain a first determining result, based on whether a duration of service transmitted between the wireless terminal and the service providing server exceeds a time threshold and whether data transmission amount of service transmitted between the wireless terminal and the service providing server exceeds a data amount threshold; and a second activating module, configured to activate the dividing module when the first determining result indicates that there is the continuous data service interaction between the wireless terminal and the service providing server.

11. The communication processing apparatus according to claim 8, further comprising:

a second determining module, configured to determine whether a signal quality of the first wireless network exceeds a preset quality threshold to obtain a second determining result; and a third activating module, configured to activate the dividing module when the second determining result indicates that the signal quality of the first wireless network is lower than the preset quality threshold.

12. The communication processing apparatus according to claim 7, wherein an uplink buffer area and a downlink buffer area are set in the network gateway device and the apparatus further comprises:

a first message sending module, configured to send a TCP ACK message that carries an information indicating a receiving window is zero to the wireless terminal so as to prevent the wireless terminal from further sending a TCP data packet when data buffered in the uplink buffer area exceeds a first data amount preset threshold; and/or a second message sending module, configured to send a TCP ACK message that carries an information indicating a receiving window is zero to the service providing server so as to prevent the service providing server from further sending a TCP data packet when data buffered in the downlink buffer area exceeds a second data amount preset threshold.

13. A network gateway device, wherein the network gateway device is coupled to a wireless terminal through a first wireless network and to a base station through a second wireless network different from the first wireless network, the network gateway device comprising:

a first TCP end, configured to maintain a first Transmission Control Protocol (TCP) link between the network gateway device and the wireless terminal through the first wireless network, when the transmission performance of the first wireless network as measured by the network gateway device is larger than a first threshold value;

a second TCP end, configured to maintain a second TCP link between the network gateway device and a service providing server through the second wireless network, when the transmission performance of the second wireless network as measured by the network gateway device is larger than a second threshold value;

a determining module, configured to determine which TCP link between the first TCP link and the second TCP link is to be optimized, based on whether or not the transmission performance to be improved between the wireless terminal and the service providing server is larger than a third threshold value, wherein the transmission performance to be improved comprises packet loss rate, transmission delay or an inverse of transmission rate for a current TCP transmission; and an optimization module, configured to perform a TCP transmission optimization on the determined TCP link between the first TCP link and the second TCP link to be optimized, so as to reduce/improve at least one of packet loss rate, transmission delay and transmission rate for the current TCP transmission corresponding to the determined TCP link to be optimized, till the transmission performance of the determined TCP link between the first TCP link and the second TCP link is smaller than or equal to the third threshold value, thereby improving a corresponding transmission performance between the wireless terminal and the service providing server.

14. The network gateway device according to claim 13, wherein when a third TCP link is already established between the wireless terminal and the service providing server, the network gateway device further comprises:
   a dividing module, configured to divide the third TCP link into the first TCP link and the second TCP link by using two TCP clients provided by the network gateway device, wherein one TCP client of the network gateway device interacts with a TCP client of the wireless terminal so as to form the first TCP link, and the other TCP client of the network gateway device interacts with a TCP client of the service providing server so as to form the second TCP link.

15. The network gateway device according to claim 14, further comprising:
   a buffer module, configured to buffer a data packet to be sent to the wireless terminal; and
   a first activating module, configured to activate the dividing module after receiving ACK messages that correspond to all data packets not buffered but sent to the wireless terminal.

16. The network gateway device according to claim 14, further comprising:
   a first determining module, configured to determine whether there is a continuous data service interaction between the wireless terminal and the service providing server to obtain a first determining result, based on whether a duration of service transmitted between the wireless terminal and the service providing server exceeds a time threshold and whether data transmission amount of service transmitted between the wireless terminal and the service providing server exceeds a data amount threshold; and
   a second activating module, configured to activate the dividing module when the first determining result indicates that there is the continuous data service interaction between the wireless terminal and the service providing server.

17. The network gateway device according to claim 14, further comprising:
   a second determining module, configured to determine whether a signal quality of the first wireless network exceeds a preset quality threshold to obtain a second determining result; and
   a third activating module, configured to activate the dividing module when the second determining result indicates that the signal quality of the first wireless network is lower than the preset quality threshold.

18. The network gateway device according to claim 13, wherein an uplink buffer area and a downlink buffer area are set in the network gateway device and the network gateway device further comprises:
   a first message sending module, configured to send a TCP ACK message that carries an information indicating a receiving window is zero to the wireless terminal so as to prevent the wireless terminal from further sending a TCP data packet when data buffered in the uplink buffer area exceeds a first data amount preset threshold; and/or
   a second message sending module, configured to send a TCP ACK message that carries an information indicating a receiving window is zero to the service providing server so as to prevent the service providing server from further sending a TCP data packet when data buffered in the downlink buffer area exceeds a second data amount preset threshold.

* * * * *